J. S. HIGHFIELD.
BEARING SUBMERGED IN WATER OR OTHER LIQUIDS.
APPLICATION FILED JULY 5, 1918.
1,286,630.
Patented Dec. 3, 1918.
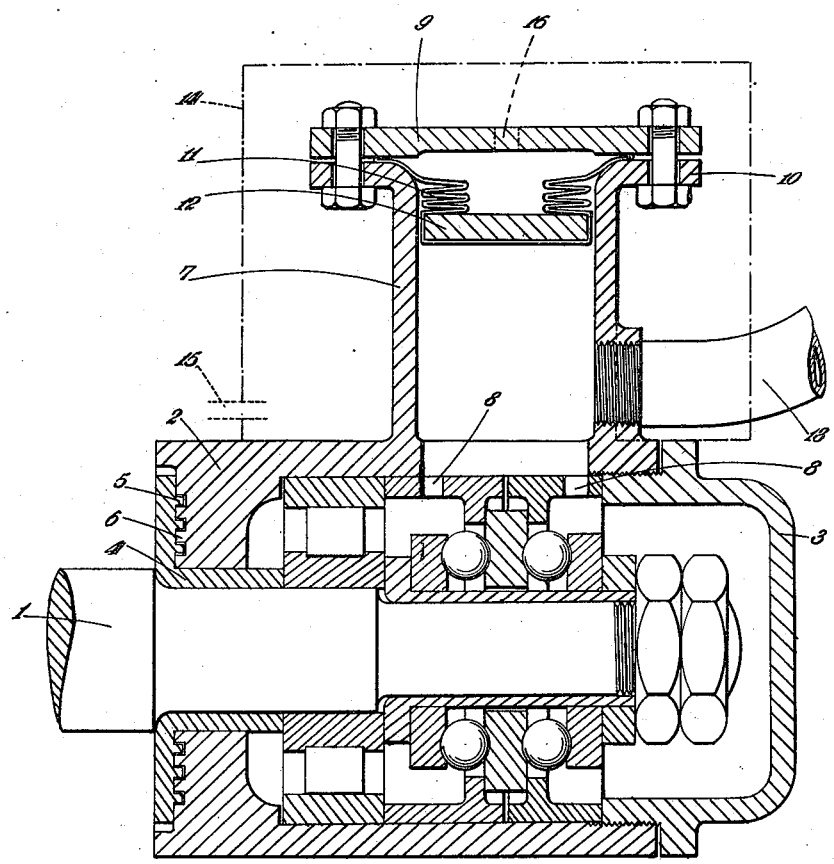

UNITED STATES PATENT OFFICE.

JOHN SOMERVILLE HIGHFIELD, OF KENSINGTON, LONDON, ENGLAND, ASSIGNOR TO SUBMERSIBLE & J-L MOTORS LIMITED, OF SOUTHALL, ENGLAND.

BEARING SUBMERGED IN WATER OR OTHER LIQUIDS.

1,286,630.   Specification of Letters Patent.   Patented Dec. 3, 1918.

Application filed July 5, 1918.   Serial No, 243,474.

*To all whom it may concern:*

Be it known that I, JOHN SOMERVILLE HIGHFIELD, a subject of the King of Great Britain, residing at 19 Cottesmore Gardens, Kensington, in the county of London, England, have invented certain new and useful Improvements in Bearings Submerged in Water or other Liquids, of which the following is a specification.

This invention relates to shaft bearings which are intended to be immersed in or run under water or other liquid.

According to this invention the shaft bearing is so constructed that access of the water or other liquid to the interior of the bearing is prevented by providing a reservoir connected to the interior of the bearing and containing lubricant which is subjected to a pressure produced by the head of water or other liquid above the bearing in addition to a pressure which is not so produced. The pressures may be transmitted to the lubricant by providing a piston or piston like part which is acted upon by a weight or by its own weight or by a spring to produce the pressure which is independent of the head of water or other liquid above the bearing means also being provided to subject the piston to a pressure dependent on the head of water.

Intermeshing projections or grooves may be provided on the adjacent fixed and moving surfaces where the shaft enters the bearings.

In order that the invention may be fully understood and readily carried into effect the same will now be more fully described with reference to the accompanying drawing which illustrates one constructional embodiment of the invention.

The bearing shown is an end bearing into which the shaft 1 projects and comprises a housing 2 closed at one end by a cap 3. Fixed on the shaft 1 is a collar 4 provided with annular projections 5 which intermesh with projections 6 on the housing 2. Integral with the housing is a cylindrical reservoir 7 which is open to the interior of the bearing through openings 8. The reservoir 7 may be closed at the top by a cap 9. Clamped between the cap 9 and a flange 10 on the upper end of the reservoir 7 is a collapsible bag or pocket 11 constructed for example of wash leather. Within the pocket is placed a weight 12. The reservoir 7 beneath the pocket is filled with lubricant through the pipe 13. A thick grease is preferably employed as the lubricant. The weight 12 serves to subject the lubricant to a steady pressure so that the lubricant tends to flow outward thereby preventing the liquid in which the bearing is immersed from entering the interior of the bearing. The intermeshing projections 5 and 6 also provide a long passage and tend to prevent the liquid creeping into the bearing.

The reservoir 7 is inclosed in a chamber 14 indicated by chain lines which chamber is provided with an opening at 15. The liquid entering the chamber compresses the air above it and an opening 16 being provided in the cap 9, the pressure generated is transmitted to the pocket 11 and therefore to the lubricant. The effect of the head of water in tending to force the water into the bearing through the passage between the collar 4 and the housing 2 is therefore neutralized and the pressure tending to force the lubricant out of the bearing is merely that due to the weight 12. Consequently this arrangement is particularly adapted for use when the head of water varies between wide limits. The air chamber may be dispensed with if the pocket is made waterproof or the weight 12 is made in the form of a piston closely fitting the reservoir 7 so as to prevent water obtaining access to the part of the reservoir containing the lubricant.

The projections 5 and 6 may be dispensed with and the housing made to fit the shaft closely or the projections 5 may be on the shaft itself and mesh with suitably arranged projections on the housing.

The invention is illustrated as applied to a bearing comprising a roller bearing and a thrust ball bearing but it can obviously be applied to any other type of bearing.

The invention is particularly adapted for use with submersible electric motors but its application is not restricted thereto.

What I claim and desire to secure by Letters Patent of the United States is:—

1. A shaft bearing adapted to be immersed in or run under water or other liquid and a reservoir connected to the interior of the bearing and containing lubricant which for the purpose described is subjected to a pressure produced by the head of water or other liquid above the bearing in addition to a pressure which is not so produced.

2. A shaft bearing adapted to be immersed in or run under water or other liquid and a reservoir forming part of the housing of the bearing and connected to the interior of the bearing and containing lubricant which for the purpose described is subjected to a pressure produced by the head of water or other liquid above the bearing in addition to a pressure which is not so produced.

3. A shaft bearing adapted to be immersed in or run under water or other liquid, a reservoir connected to the interior of the bearing and containing lubricant and a piston in said reservoir adapted to force the lubricant into the bearing and subjected to a pressure produced by the head of water or other liquid above the bearing for the purpose specified.

4. A shaft bearing adapted to be immersed in or run under water or other liquid comprising a reservoir connected to the interior of the bearing and containing lubricant, a chamber, a connection leading from near the top of said chamber to the said reservoir, and an opening near the bottom of said chamber to admit said water or other liquid whereby said lubricant is subjected to a pressure produced by the head of water or other liquid above the bearing as well as to a pressure which is not so produced.

5. A shaft bearing adapted to be immersed in or run under water or other liquid, a reservoir connected to the interior of the bearing and containing lubricant which for the purpose described is subjected to a pressure produced by the head of water or other liquid above the bearing in addition to a pressure which is not so produced and intermeshing projections on the adjacent fixed and moving surfaces where the shaft enters the bearing.

6. A shaft bearing adapted to be immersed in or run under water or other liquid, a reservoir forming part of the housing of the bearing and connected to the interior of the bearing and containing lubricant which for the purpose described is subjected to a pressure produced by the head of water or other liquid above the bearing in addition to a pressure which is not so produced and intermeshing projections on the adjacent fixed and moving surfaces where the shaft enters the bearing.

7. A shaft bearing adapted to be immersed in or run under water or other liquid, a reservoir connected to the interior of the bearing and containing lubricant, a piston in said reservoir adapted to force the lubricant into the bearing and subjected to a pressure produced by the head of water or other liquid above the bearing for the purpose described and intermeshing projections on the adjacent fixed and moving surfaces where the shaft enters the bearing.

8. A shaft bearing adapted to be immersed in or run under water or other liquid comprising a reservoir connected to the interior of the bearing and containing lubricant, a chamber, a connection leading from near the top of said chamber to the said reservoir, an opening near the bottom of said chamber to admit said water or other liquid whereby said lubricant is subjected to a pressure produced by the head of water or other liquid above the bearing as well as to a pressure which is not so produced and intermeshing projections on the adjacent fixed and moving surfaces where the shaft enters the bearing.

JOHN SOMERVILLE HIGHFIELD.